(12) United States Patent
Wu et al.

(10) Patent No.: US 8,972,453 B2
(45) Date of Patent: Mar. 3, 2015

(54) METHOD AND SYSTEM FOR LONGEST PREFIX MATCHING OF VARIABLE-SIZED HIERARCHICAL NAMES BY TREELETS

(75) Inventors: Jianming Wu, Fremont, CA (US); Guangyu Shi, Cupertino, CA (US); Fu Li, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 153 days.

(21) Appl. No.: 13/469,528

(22) Filed: May 11, 2012

(65) Prior Publication Data

US 2012/0290696 A1 Nov. 15, 2012

Related U.S. Application Data

(60) Provisional application No. 61/485,201, filed on May 12, 2011.

(51) Int. Cl.
*G06F 7/00* (2006.01)
*G06F 17/30* (2006.01)

(52) U.S. Cl.
CPC ................................ *G06F 17/30091* (2013.01)
USPC ............ 707/797; 707/758; 707/791; 709/203

(58) Field of Classification Search
USPC .......... 709/201–223, 232, 238, 245; 707/698, 707/705–708, 713–716, 722, 723, 736, 737, 707/741, 755, 769–771, 786, 791, 797
See application file for complete search history.

(56) References Cited

U.S. PATENT DOCUMENTS

| | | | | |
|---|---|---|---|---|
| 5,410,691 A | * | 4/1995 | Taylor | 340/2.81 |
| 5,706,510 A | * | 1/1998 | Burgoon | 1/1 |
| 6,041,324 A | * | 3/2000 | Earl et al. | 1/1 |
| 6,055,527 A | * | 4/2000 | Badger et al. | 1/1 |
| 6,792,423 B1 | | 9/2004 | Jeffries et al. | |

(Continued)

FOREIGN PATENT DOCUMENTS

| | | | | |
|---|---|---|---|---|
| EP | 2214356 A1 | * | 8/2010 | H04L 12/56 |
| EP | 2214357 A1 | * | 8/2010 | H04L 12/56 |

(Continued)

OTHER PUBLICATIONS

Foreign Communication From a Related Counterpart Application, International Application No. PCT/US2012/037568, International Search Report dated Jan. 2, 2013, 3 pages.

(Continued)

*Primary Examiner* — Hassan Kizou
*Assistant Examiner* — Phyllis Book
(74) *Attorney, Agent, or Firm* — Conley Rose, P.C.; Grant Rodolph; Brandt D. Howell

(57) ABSTRACT

A method for determining a location of a requested resource, comprising receiving a request for a resource, wherein the resource is identified by a hierarchically structured name, decomposing the hierarchically structured name into a plurality of segments, comparing each of the plurality of segments to parent nodes of a plurality of two-level treelets, wherein the comparing of at least two of the plurality of segments to parent nodes of the plurality of two-level treelets is performed in a parallel manner, wherein combinations of two-level treelets comprise a hierarchical name of a network resource, and determining a longest prefix match of the hierarchically structured name.

23 Claims, 7 Drawing Sheets

(56) References Cited

U.S. PATENT DOCUMENTS

| | | | |
|---|---|---|---|
| 6,947,950 B2 * | 9/2005 | Murthy et al. | 1/1 |
| 7,031,971 B1 * | 4/2006 | Taillefer | 1/1 |
| 7,114,008 B2 * | 9/2006 | Jungck et al. | 709/246 |
| 7,116,249 B2 * | 10/2006 | McCanne et al. | 341/50 |
| 7,146,429 B2 * | 12/2006 | Michel | 709/238 |
| 7,277,885 B2 * | 10/2007 | Eppley et al. | 1/1 |
| 7,383,244 B2 | 6/2008 | Bass et al. | |
| 7,539,771 B2 * | 5/2009 | de Castro et al. | 709/238 |
| 7,602,785 B2 | 10/2009 | Dharmapurikar et al. | |
| 7,664,866 B2 * | 2/2010 | Wakefield | 709/229 |
| 7,720,846 B1 * | 5/2010 | Bayliss | 707/736 |
| 7,769,779 B2 * | 8/2010 | Havens et al. | 707/783 |
| 7,827,210 B2 * | 11/2010 | Meliksetian et al. | 707/803 |
| 7,849,156 B2 * | 12/2010 | Alpern et al. | 709/217 |
| 8,160,069 B2 * | 4/2012 | Jacobson et al. | 370/392 |
| 8,204,060 B2 * | 6/2012 | Jacobson et al. | 370/392 |
| 8,326,839 B2 * | 12/2012 | Idicula et al. | 707/747 |
| 8,402,147 B2 * | 3/2013 | Bondy | 709/228 |
| 8,434,156 B2 * | 4/2013 | Li et al. | 726/27 |
| 2004/0088306 A1 * | 5/2004 | Murthy et al. | 707/100 |
| 2008/0056207 A1 * | 3/2008 | Eriksson et al. | 370/338 |
| 2010/0195653 A1 | 8/2010 | Jacobson et al. | |
| 2010/0195654 A1 | 8/2010 | Jacobson et al. | |
| 2010/0195655 A1 | 8/2010 | Jacobson et al. | |
| 2011/0161409 A1 * | 6/2011 | Nair et al. | 709/203 |

FOREIGN PATENT DOCUMENTS

| | | | |
|---|---|---|---|
| WO | 03005288 A2 | | 1/2003 |
| WO | WO 03005288 A2 * | | 1/2003 |

OTHER PUBLICATIONS

Foreign Communication From a Related Counterpart Application, International Application No. PCT/US2012/037568, Written Opinion dated Jan. 2, 2013, 9 pages.

* cited by examiner

METHOD AND SYSTEM FOR LONGEST PREFIX MATCHING OF VARIABLE-SIZED HIERARCHICAL NAMES BY TREELETS

CROSS-REFERENCE TO RELATED APPLICATIONS

The present application claims the benefit of U.S. Provisional Patent Application No. 61/485,201 filed May 12, 2011 by Jianming Wu, et al. and entitled "Method and System for Longest Prefix Matching of Variable-Sized Hierarchical Names by Treelets," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In computer systems, there are two widely applied ways to locate/identify resources: flat names and hierarchical names. The flat name is consisted of a fixed or variable length of string to uniquely represent a resource. Exact matching is used to look up a resource. One example of flat names is the 48-bit Ethernet media access control (MAC) address described in Institute of Electrical and Electronics Engineers (IEEE) 802.3, which is incorporated herein by reference as if reproduced in its entirety. Systems incorporating flat names do not scale well because they can grow only so large before all available names are used up. A hierarchical name is divided into different areas, which can be thought of as subnames. Systems incorporating a hierarchical name structure are said to comprise a hierarchical name space. The hierarchical name space may be thought of as a tree with each subname representing a branch of a tree from a root name. Thus, each area is its own subname space within an overall name space. Therefore, each object must have a unique name only within its subname space in order to have an unambiguously resolvable name within the name space hierarchy. Thus, in contrast to flat name spaces, systems incorporating hierarchical names can scale to extremely large networks.

SUMMARY

In one embodiment, the disclosure includes a method for determining a location of a requested resource, comprising receiving a request for a resource from a client, wherein the resource is identified by a hierarchically structured name, decomposing the hierarchically structured name into a plurality of segments, comparing each of the plurality of segments to parent nodes of a plurality of two-level treelets, wherein the comparing of at least two of the plurality of segments to parent nodes of the plurality of two-level treelets is performed in a parallel manner, wherein combinations of two-level treelets comprise a hierarchical name of a network resource, and determining a longest prefix match of the hierarchically structured name.

In another embodiment, the disclosure includes a network unit for lowest prefix matching with treelets, comprising a plurality of ingress and egress ports, a treelet data store comprising a plurality of two-level treelets wherein the two-level treelets represent segments of hierarchically named resources in a network, and a processor coupled to the plurality of ingress and egress ports and coupled to the treelet data store, wherein the processor is configured to decompose the hierarchically structured name into a plurality of segments, wherein the processor is further configured to compare each of the plurality of segments to parent nodes of the plurality of two-level treelets, wherein the comparing of at least two of the plurality of segments to parent nodes of the plurality of two-level treelets is performed in a parallel manner, wherein combinations of two-level treelets comprise a hierarchical name of a network resource, and wherein the processor is further configured to determine a longest prefix match of the hierarchically structured name.

In another embodiment, the disclosure includes a system for longest prefix matching with two-level treelets, comprising a longest prefix matching (LPM) switch, and a plurality of storage units coupled to the LPM switch, wherein the LPM comprises a plurality of ingress ports, a plurality of egress ports, a treelet data store and a processor coupled to the data store, wherein the plurality of ingress ports are configured to receive a request from a client, wherein the request comprises a hierarchically structured name, wherein the treelet data store comprises a plurality of two-level treelets wherein the two-level treelets represent segments of hierarchically named resources in a network, wherein the processor is configured to decompose a hierarchically structured name into a plurality of segments, wherein the processor is further configured to compare each of the plurality of segments to parent nodes of the plurality of two-level treelets, wherein the comparing of at least two of the plurality of segments to parent nodes of the plurality of two-level treelets is performed in a parallel manner, wherein combinations of two-level treelets comprise a hierarchical name of a network resource, and wherein the processor is further configured to determine a longest prefix match of the hierarchically structured name.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
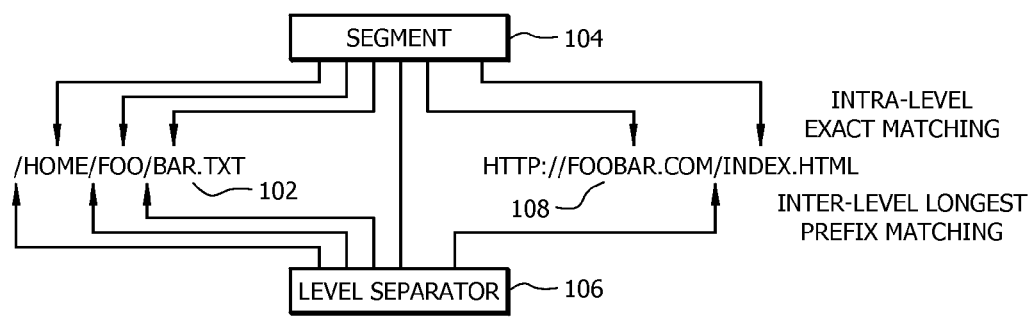
FIG. 1 shows two examples of variable-sized hierarchical names.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Hierarchical names are more widely used than flat names in both small and large computer systems due to their scalability and ease of use. In this naming scheme, resources are organized into hierarchies. Thus, the hierarchical names can be divided into multiple levels by pre-defined separators. Internet Protocol (IP) addresses and file system filenames are two typical examples of hierarchical names. The lookup method for hierarchical names may be exact matching, in which case the rule set contains all the names. The lookup method may also be a hybrid of longest prefix matching for inter-level segments and exact matching for intra-level segments. In such a case, the rule set contains fewer items due to name aggregation by prefix. For example, in a file system with three directories: "/", "/foo", "/foo/bar", the matching result of filename "/fobar" is "/"; and the matching result of "/foo/bar/test.out" is "/foo/bar". Although it is not strictly longest prefix matching method, the name longest prefix matching (LPM) is used to represent this hybrid method in the document for simplicity.

Disclosed herein are systems, apparatuses, and methods for determining the location of a resource in a hierarchically structured naming system using treelets to efficiently handle the longest prefix matching for variable-sized hierarchical names. The resource may be, for example, a web page, a file, an application, streaming video, audio, or other content. The resource may also be a storage device, a server, a switch, or any other network device. The resource may be any device, software, firmware, or content addressable in a network by a hierarchical name. In an embodiment, each hierarchically structured name is divided into a plurality of two level treelets that comprise the hierarchically structured name. The treelets are stored in a data store, such as a forwarding index base (FIB), in a longest prefix match (LPM) switch. When a request for a resource with a hierarchically structured name is received by the LPM switch from a client, the LPM switch decomposes the received hierarchically structured name into its component two level treelets (or segments). Each of these treelets is compared to the stored treelets in a parallel manner. The longest prefix match is determined by determining the first received treelet for which a match is not found. The longest prefix match is then determined to be the combination of treelets having a match before the first treelet for which a match is not found. An egress port for where the requested resource may be located may then be obtained from the FIB using the longest prefix match. The request may then be forwarded through the determined egress port and the requested resource retrieved or manipulated.

Variable-sized hierarchical names, like absolute file path and uniform resource identifier (URI), are commonly used in computer systems to identify and/or locate resources. To handle these hierarchical names, a hybrid look up method comprised of longest prefix matching for inter-level segments and exact matching for intra-level segments is used. For a large system, the size and number of the hierarchical names can both become too large to be efficiently handled.

The disclosed methods, systems, and apparatuses take advantage of the two-level tree data structure to reduce the search space in the longest prefix matching. Given a certain rule set, a bunch of treelets are created for fast identifying the longest matched prefix of a lookup request. The disclosed methods, systems, and apparatuses may be applied to build content routers in content oriented networks and file request redirectors in native networked storage systems.

FIG. 1 shows two examples of variable-sized hierarchical names. One hierarchical name 102 is "/home/foo/bar.txt" with segments 104 of "home", "foo", and "bar.txt" with level separators 106 denoted by "/". Another hierarchical name 108 is "http://foobar.com/index.html" with segments 104 of "foobar.com" and "index.html" with level separators 106 again denoted by "/". Although depicted with "/" separators, those of ordinary skill in the art will recognize other methods for denoting a separator between segments.

In a Content Oriented Network (CON) or native networked storage and file system, resources (web pages, videos, images, files) are mostly named using hierarchical names. Due to the variable size of stored content and user experience, the sizes of the hierarchical names are usually not fixed. For a typical CON system or distributed file system, there may be more than millions, even billions, of resources or aggregated prefixes. The large amount of variable-sized hierarchical names makes these systems difficult to look up resources at high speed, or comparable to the line rate lookup engines deployed in high performance routers.

A tree is a fundamental data structure in computer science. It is an ordered directed tree comprised of a set of linked nodes. The tree data structure is very expressive for hierarchical structures. A two-level treelet is one of the basic trees and comprises a parent and one or multiple children. One tree can be expressed as a plurality of two-level treelets. These treelets, when aligned in a hierarchy, may form the original tree by an equal join operation.

Figure 2:
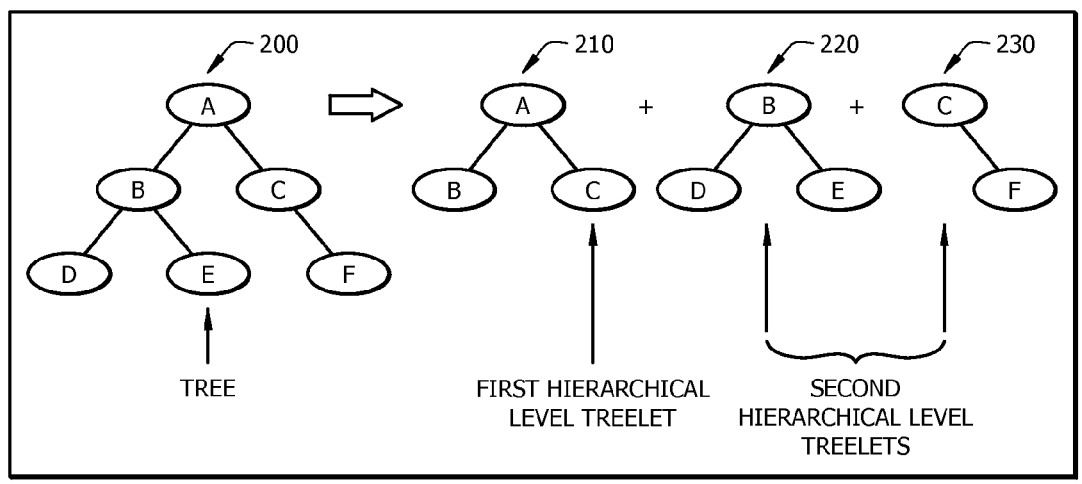
FIG. 2 depicts an example of a tree and treelets that can re-construct the tree.

FIG. 2 depicts an example of a tree 200 and treelets 220 and 230 that can re-construct the tree 200. Tree 200 comprises nodes A, B, C, D, E, and F. Tree 200 can be represented as a first hierarchy level two-level treelet 210 and a second hierarchy level two-level treelets 220 and 230. First hierarchy level two-level treelet 210 includes nodes A, B, and C. Second hierarchy level two-level treelet 220 comprises nodes B, D, and E. Secord hierarchy level two-level treelet 230 comprises nodes C and F. The parent nodes of the second hierarchy level treelets 220 and 230 are the child nodes of the first hierarchy level treelet 210. Although the example in FIG. 2 shows a tree 210 comprising only two hierarchy levels of treelets, the number of hierarchy levels may be greater than two. Thus, in general, the parent nodes of a hierarchy level of the treelets are the child nodes of the hierarchy level immediately preceding it. Also, although each of treelets 220 and 230 are shown with no more than two child nodes, in general, each treelet may have more than two child nodes. The term hierarchy level may be used to distinguish between the level of the treelet in the hierarchy of the tree, as opposed to the term "two-level", which refers to the fact that each treelet comprises a parent node and one or more child nodes.

Equal join can be used to reconstruct a tree from hierarchical two-level treelets. Take the tree 200 as an example, a second hierarchy level treelet 220 with parent node "B" is anchored to the child "B" of the first hierarchy level treelet 210; and a second hierarchy level tree 230 with parent node "C" is anchored to the child "C" of the first hierarchy level treelet 210. Repeating the process from the first hierarchy level to the last hierarchy level enables a complete tree to be reconstructed.

In most scenarios, the prefix rule set of longest prefix matching can be represented by a tree. If there are multiple roots, a common dummy node may be used to connect a forest into one giant tree. Some application scenario can naturally be mapped to a tree, like the namespace of a file system. The prefix rule set thus can be viewed as a subset of the tree.

This giant tree of prefix rule set can be decomposed into a bunch of hierarchical two-level treelets without loss of the ordering relationship. The process of decomposing a tree into hierarchical two-level treelets is straightforward: iteratively take each node of the tree for consideration, put all its children and itself to be a two-level treelet. The hierarchy of this treelet is determined by the parent node's hierarchy in the giant tree.

The longest prefix matching of variable-sized hierarchical names can be done more efficiently with the help of treelet data structure. The matching can be done independently level-wise. For each level, the segment is matched against the parent nodes of the treelets of each level. There may be zero, one, or multiple matches (due to collisions resulting from compressed expression). Then all the information of the children of the parent node(s) are also fetched. Once the level-wise matching is done or one mismatch is found, the collected per-level results are joined using equal join to reconstruct the complete path within the giant tree. The first mismatch starting from the root indicates the end of matched longest prefix.

The per-level matching can be handled in parallel as they are independent of each other. This is the process of trimming down the problem search space for a high efficient longest prefix matching procedure. The whole process can be done in a map/reduce model or in the Application-specific Integrated Circuit (ASIC)/Field-programmable Gate Array (FPGA)/generic microprocessors with multi-core capability for hardware parallelism. However, straightforward level-wise linear probing is also possible.

Figure 3:
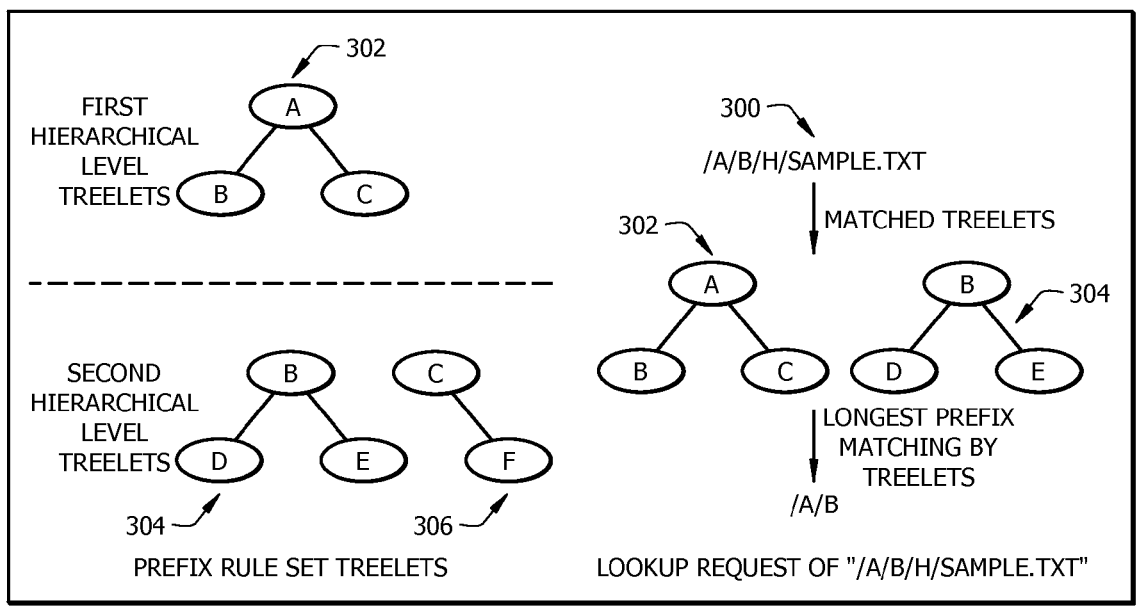
FIG. 3 is an example of using longest prefix matching for a resource identifier name.

FIG. 3 is an example of using longest prefix matching for a resource identifier name "/A/B/H/sample.txt" 300. The prefix rule set treelets are first hierarchical level treelet 302 and second hierarchical level treelets 304 and 306. Based on the prefix rule set treelets, two treelets 302 and 304 are identified for the first two hierarchy levels of the resource identifier name 300 (e.g., "A" and "B"); while the third hierarchy level of resource identifier name 300 (e.g., "H") generates a mismatch. Equal join of the two treelets generates a match. Thus, the longest prefix matching of "/A/B/H/sample.txt" is "/A/B" based on the prefix rule set.

The longest prefix matching by treelets for variable-sized hierarchical names may be used to build matching system in Content Oriented Networks (CONs) or native networked storage and file systems. In one embodiment, a longest prefix matching by treelet method is applied to build the interest matching system in content routers for content oriented networks. In a CON, hierarchical names are used to identify resources. Their location information is collectively stored in the content routers. When a resource is needed, the user sends out an interest packet to the CON. The content router captures the interest, puts it to the Pending Interest Table (PIT) and forwards it to the proper destinations based on the interest matching result.

In another embodiment, a longest prefix matching by treelet method is applied to build a file request redirector for the native networked storage and file system. In the native networked storage and file system, a file request redirector is deployed in some special switches to redirect file system requests to proper file servers. The users may not be aware of the servers and special switches behind the scene. Ordinary or slightly modified distributed file system requests are sent by users for file system operations. The special switch catches those requests, compares the file requests to resource name prefixes, and then forwards the request to the destinations.

In these scenarios, the number of aggregated resource name prefixes may be more than a million and the average size of an interest or file system request may be several hundred bytes. Thus, the longest prefix matching by treelets may help reduce the matching search space which in turn reduces matching workload of interests and file system requests against the resource name prefixes.

Additionally, a longest prefix matching by treelet method may not incur significant overhead. The overhead of building prefix rule set treelets can be minimized and amortized by running it in background, incremental updates, and shadow buffers. The overhead of per-level check can be minimized by hardware and/or software parallelism.

Two-level treelets may compress the identical prefix rules, e.g., /A/B/C, /A/B/D and /A/B/E will come to only three treelets: A/B, B/C, B/D, B/E. Thus, nine characters become eight. In the real file system, the prefix rule size may reduce to about ¼ of the rule size without treelets. Furthermore, independent matching can be done on various types of hardware with massive cores, such as, for example, a graphics processing unit (GPU) or a FPGA. The performance can speed up by about 6 times on a GPU than that on comparable central processing units (CPUs).

The disclosed LPM methods may provide high performance since the majority of the disclosed LPM methods may be performed independently at each hierarchical level by independent look-up agents which enables fully parallel lookups. This feature may not only improve lookup throughput, but may also reduce latency. The disclosed LPM methods may also increase storage efficiency. The prefix rule set may be decomposed into hierarchical two-level treelets without loss of the inherent parent-child relationship information with much less space cost (i.e., rule set compression).

Figure 4:
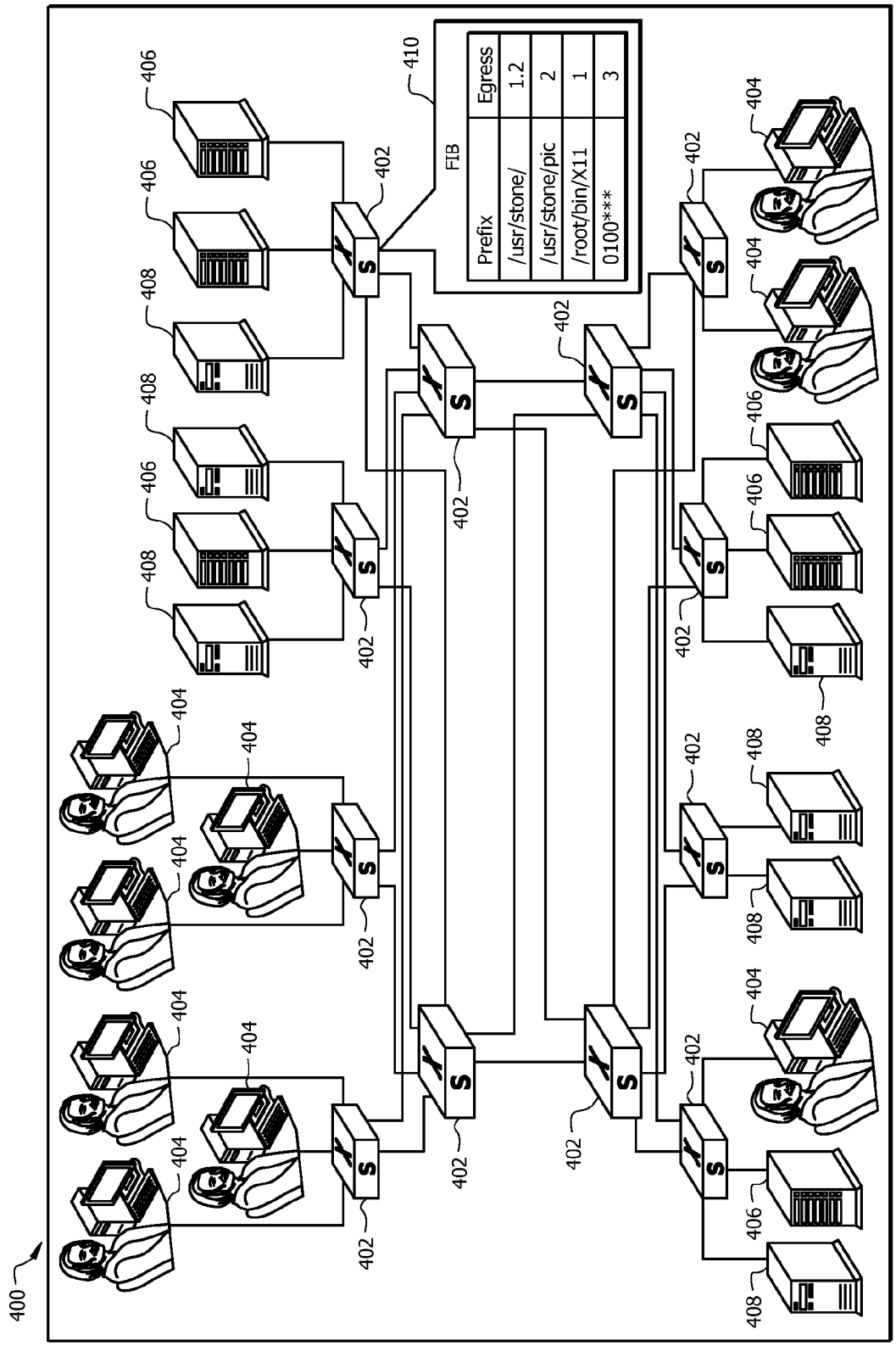
FIG. 4 is an example of a networking system in which the longest prefix matching by treelet method may be implemented.

FIG. 4 shows a network 400 in which a longest prefix matching by treelet method may be implemented. Network 400 may comprise a plurality of LPM switches 402, a plurality of clients 404, a plurality of first storage nodes 406, and a plurality of second storage nodes 408. The components of network 400 may be arranged as shown in FIG. 4. Each LPM switch 402 may comprise a forwarding information base (FIB), such as FIB 410. The FIB 410 may comprise a plurality of prefixes and a plurality of associated egress port identifiers. For example, FIB 410 comprises prefixes "/usr/stone/", "/usr/stone/pic", "/root/bin/X11", and "0100***" with corresponding egress port identifiers 1, 2, and 3 as shown. Each LPM switch 402 may also comprise a data store of treelets (not shown) that comprise the various resource names in the network 400.

The first storage nodes 406 may be portable operating system interface (POSIX) file systems (FS) responsible for one or multiple subtrees in the POSIX FS. For example, one of the first storage nodes 406 may be responsible for subtree "/usr/stone/pic" and a different first storage node 406 may be responsible for subtree "/usr/stone/rootbin/X11/" as shown in FIG. 4. The second storage nodes 408 may be storage nodes using a distributed hash table (DHT) naming convention. For example, one of second storage nodes 408 may be responsible for subtree "01000XXX". Other types of storage nodes may also be used. The LPMs 402 may support all types of naming conventions utilized by the storage nodes 406, 408 in the network 400.

A client 404 may send a request for a resource to one of LPM switches 402. For example, a client 404 may request to read "/usr/stone/pic/1.jpg". The receiving LPM switch 402 may receive the request and decompose the resource identifier into its hierarchical segments. The hierarchical segments may be compared to the treelets. The comparisons of segments to the treelets may be performed in a parallel manner. The longest prefix match for the request is determined by joining the segments from the root up until the first segment for which a match is not found. Thus, the longest prefix match for the request to read "/usr/stone/pic/1.jpg" is "/usr/stone/pic". The LPM switch 402 locates the entry for "/usr/stone/pic" in FIB 410 and determines that the egress port is "2". The request is forward by the LPM switch 402 through egress port "2" to the first storage node 408 responsible for the subtree "/usr/stone/pic". The LPM receives the resource identified by "/usr/stone/pic/1.jpg" from the first storage node 408 and forwards the resource back to the requesting client 404.

Figure 5:
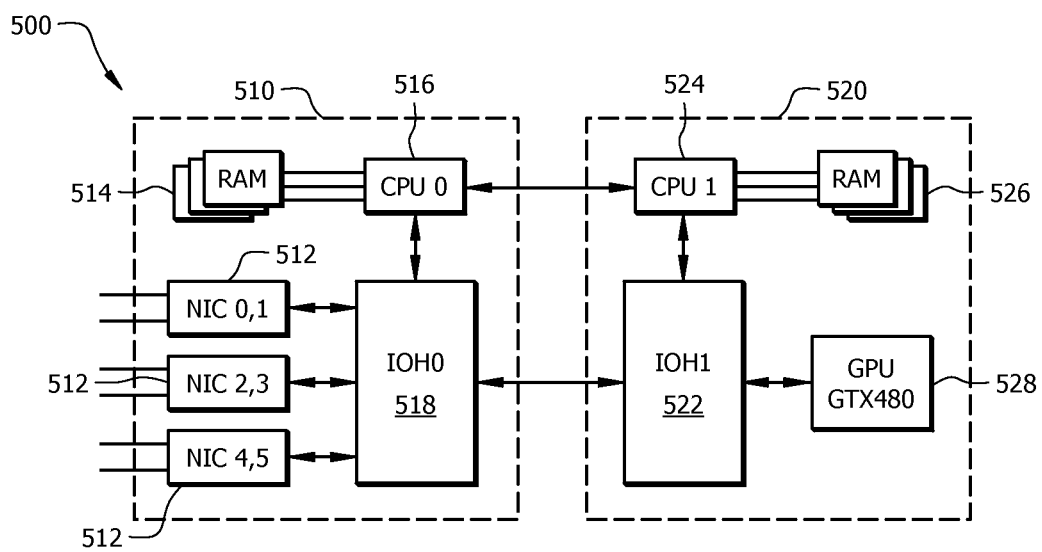
FIG. 5 is a block diagram of a Graphics Processing Unit (GPU) based LPM model hardware according to an embodiment.

FIG. 5 is a block diagram of an exemplary GPU-based LPM model hardware according to an embodiment. Processing component 500 may be implemented in any of LPM switches 402. Processing component 500 may comprise a packet processing unit 510, such as, for example, an Intel® Data Plane Development Kit (DPDK) packet processing unit, and a GPU-based processing unit 520. The packet processing unit 510 may comprise a plurality of network interface cards (NICs) 512 for receiving data packets from and sending data packets to other components within the network 400. The packet processing unit 510 may also comprise random access memory (RAM) 514 and at least one central processing unit (CPU) 516. The packet processing unit 510 may also comprise an input/output hub (IOH) 518 coupled to the NICs 512 and to the CPU 516.

The GPU-based processing unit 520 may comprise an IOH 522 coupled to IOH 518. In addition, GPU-based processing unit 520 may comprise a CPU 524, RAM 526, and a GPU 528. As depicted, the GPU 528 may be, for example, a GeForce® GTX480; however, other types of GPUs may be utilized. The requested resource names may be obtained by IOH 522 from IOH 518. GPU 528 may slice or decompose the resource name into its respective segments and then compare the segments to the treelets which may be stored in RAM 526. Once the longest prefix match for the requested resource is obtained, the GPU 528 may determine the appropriate port of NIC 512 corresponding to the longest prefix match and return the port value to the packet processing unit 510. The packet processing unit 510 may then forward the request out through the appropriate port of the NIC 512. The components of processing component 500 may be arranged as shown.

Figure 6:
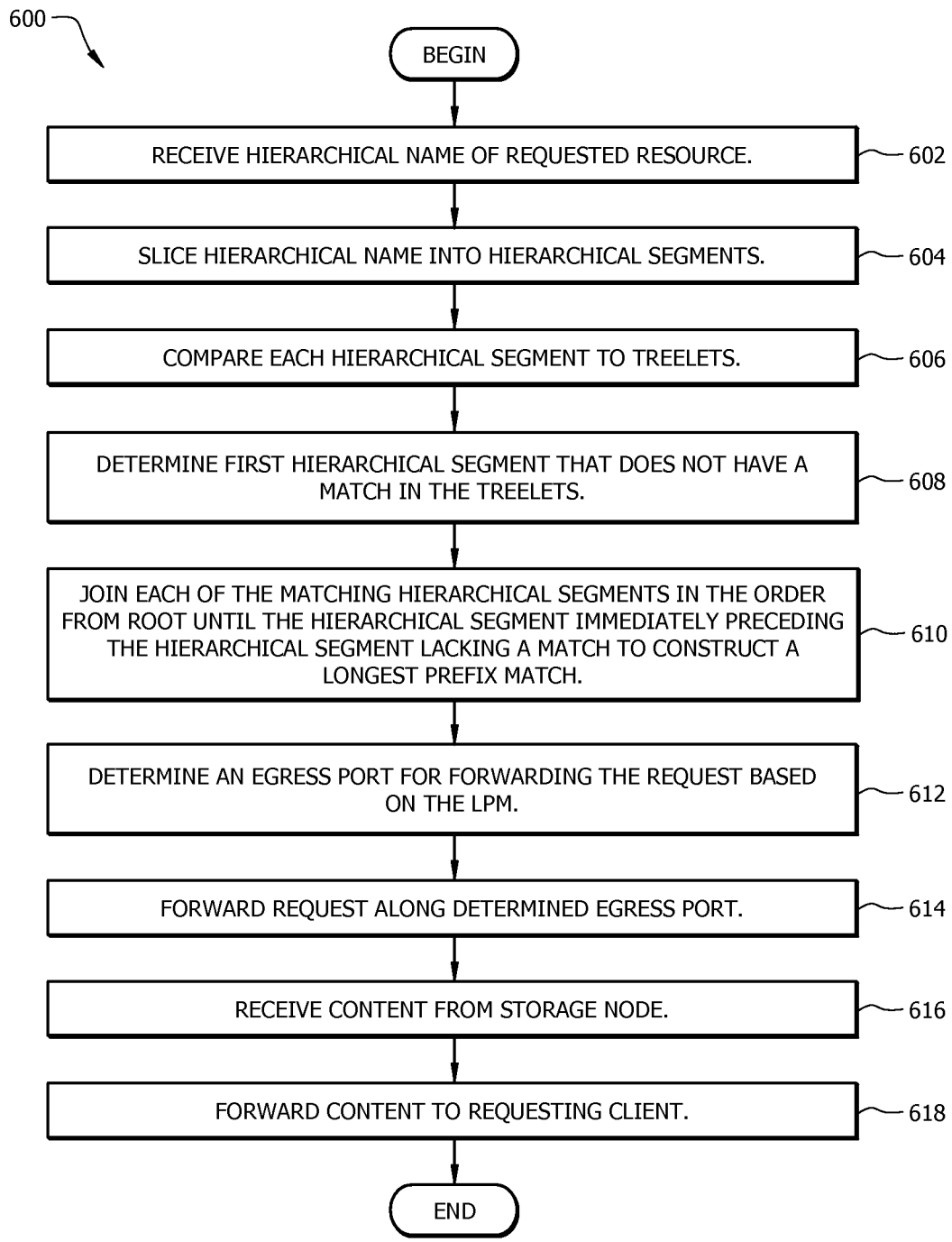
FIG. 6 is a flowchart of an exemplary method of performing longest prefix match using treelets according to an embodiment.

FIG. 6 is a flowchart of an exemplary method 600 of performing longest prefix match using treelets according to an embodiment. The method 600 may begin at block 602 where an LPM switch may receive a hierarchical name of a requested resource. At block 604, the LPM switch may slice or decompose the hierarchical name into its hierarchical segments. At block 606, the LPM switch compares each of the hierarchical segments to treelets of the resource trees in the network. At least some of the comparisons may be performed in a substantially parallel fashion. At block 608, the LPM switch determines the first hierarchical segment that does not have a match in the treelets. At block 610, the LPM switch may join each of the matching hierarchical segments in order from the root to the hierarchical segment immediately preceding the hierarchical segment lacking a match to construct a longest prefix match. At block 612, the LPM switch may determine an egress port for forwarding the request based on the longest prefix match. The LPM switch may consult a FIB to determine the egress port. At block 614, the LPM may forward the request along to a resource through the determined egress port. If the request is a request to receive for content, the LPM may receive the content from the storage node at block 616 and then, at block 618, forward the received content to the requesting client, after which the method 600 may end.

An example of treelet decomposition, storage efficiency, and treelet lookup is provided. Regarding treelet decomposition, prefix rule set can be decomposed into hierarchical two-level treelets without loss of the inherit parent-child relationship information with much less space cost (rule set compression).

Here are some real examples to show how to reach storage efficiency. In a real file system, we may have entries like these (10 entries as example) depicted in Table 1.

TABLE 1

/var
/var/mail
/var/backups
/var/backups/gshadow.bak
/var/backups/dpkg.status.2.gz
/var/backups/group.bak
/var/backups/apt.extended_states.6.gz
/var/backups/shadow.bak
/var/backups/dpkg.status.0
/var/backups/apt.extended_states.2.gz With exact treelet decomposition, these 10 entries become 10 treelets as depicted in Table 2.

TABLE 2 backups/apt.extended_states.2.gz
backups/apt.extended_states.6.gz
backups/dpkg.status.0
backups/dpkg.status.2.gz
backups/group.bak
backups/gshadow.bak
backups/shadow.bak
var
var/backups
var/mail For a real file system with large number of files, this decomposition can reduce the storage size to about ½ to about ¼ of the original storage size with full information about the original hierarchical information as well as the exact string information.

In addition, storage of the data is relatively efficient because the tree or resource identifier can be reconstructed from the treelets. For example, we can reconstruct the /var/backups/group.bak with two treelets, /var/backup and backup/group.bak.

Figure 7:
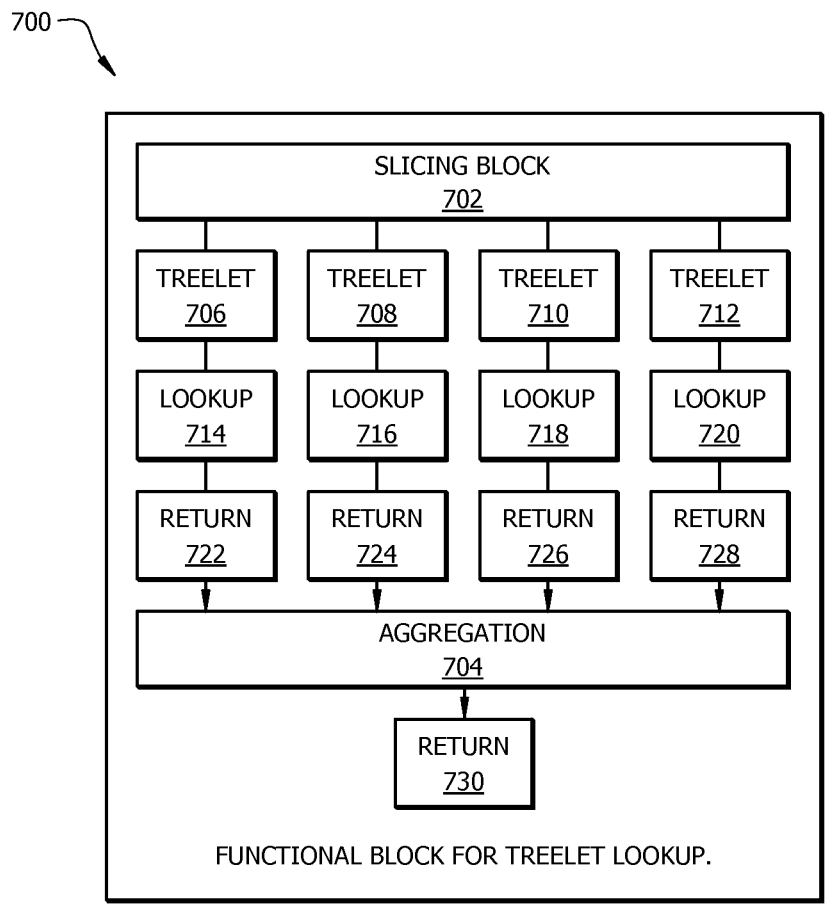
FIG. 7 depicts a block diagram illustrating a method for treelet lookup in accordance with an embodiment.

FIG. 7 depicts a block diagram illustrating a system 700 for treelet lookup in accordance with an embodiment. System 700 may comprise a slicing unit 702 and an aggregation unit 704. The slicing unit 702 may slice the hierarchical name of a requested resource into its component segments or treelets. In the depicted example, the segments comprise four treelets 706, 708, 710, and 712. The system 700 may perform a lookup routine 714, 716, 718, and 720 for each of the treelets 706, 708, 710, and 712 and return 722, 724, 726, and 728 an indication of a match or no match for each treelet 706, 708, 710, and 712. The aggregation unit 704 may aggregate the matching treelets into a longest prefix match and return the result 730.

Since the treelets 706, 708, 710, and 712 become independent with each other, independent matching may be performed in a parallel way as shown in FIG. 7. Again in this example, if we are looking for /var/backups/ground.bak. We first slice the input entry into treelets: var/backups and backups/ground.bak. Then the look up engine will conduct two matching independently with these treelets, and return both one (since they can be found, otherwise return zero). Then the longest prefix matching should be the second treelet, namely, /var/backups/ground.bak. The aggregation of each treelet return can be done in both the sequential or parallel way, for example, linear search, binary search, k-ary search or SIMD (single instruction multiple data) search and so on.

As shown above, the disclosed methods, systems, and apparatuses are complementary to other methods of lookup. First, the disclosed treelet methods provide a general strategy of how to decompose a hierarchical structure into parallel substructures (treelets) while preserving the original information. This method is completely independent with that which algorithm to deal with slicing, lookup, or aggregation. Second, other lookup methods may be easily integrated with the disclosed methods, systems, and apparatuses to achieve further storage efficiency or performance gain.

The disclosed methods may be integrated with a hash map. For example, if a hash key/map or other compression method is used to represent the treelet, the treelets compression can further reduce the storage size to 1/10 of the storage size without treelets and without compression or further. However, compression techniques raise the probability of collisions. The above treeletes in Table 2 after compression with a hash map are depicted in Table 3.

TABLE 3

| |
|---|
| 1000 |
| 1001 |
| 1002 |
| 1003 |
| 1004 |
| 1005 |
| 1006 |
| 101 |
| 102 |
| 103 |

As another example, the disclosed methods, systems, and apparatuses may also integrate Huffman compression. For simplicity, we can construct a Huffman table as shown in Table 4.

TABLE 4

| | |
|---|---|
| A | backups |
| B | apt.extended_states.2.gz |
| C | apt.extended_states.6.gz |
| D | dpkg.status.0 |
| E | dpkg.status.2.gz |
| F | group.bak |
| G | gshadow.bak |
| H | shadow.bak |
| I | var |
| J | mail |

Then the treelets shown in Table 2 become as shown in Table 5.

TABLE 5

| |
|---|
| A/B |
| A/C |
| A/D |
| A/E |
| A/F |
| A/G |
| A/H |
| I |
| I/A |
| I/J |

In a special case of a treelet algorithm, a ghost ID can be created to eliminate duplication of node names and incorrect longest prefix matching. In the sections above, the ideas and implementation of treelets algorithms are described, as well as the integration with other methods. In the following sections, a special case in treelet algorithms is examined and a method for handling it is provided. To make it simple and intuitive, capital A, B, C, D, and E are used instead the real directory or file names. Hierarchical names are shown in Table 6.

TABLE 6

| |
|---|
| A/B/C |
| D/B/E |

The above two hierarchical names in Table 6 will becomes three treelets as shown in Table 7.

TABLE 7

| |
|---|
| A/B |
| B/C |
| D/B |
| B/E |

If an input request with "A/B/E" is received, it is sliced into treelets "A/B" and "B/E". Obviously, these two treelets will both be found in Table 7. Then the return will be "A/B/E". However, this is an incorrect longest prefix matching since there is no resource with hierarchical name "A/B/E".

Incorrect longest prefix matching as shown above is due to a common "B" in Table 7. In order to eliminate the incorrect longest prefix matching problem resulting from the common "B", a ghost ID (e.g., 0, 1, 2, etc.) is defined to differentiate these two "Bs". With the introduction of the ghost ID, the treelets in Table 7 become as shown in Table 8 which depicts treelets with ghost IDs.

TABLE 8

| |
|---|
| A/B0 |
| B0/C |
| D/B1 |
| B1/E |

Then the treelets in Table 8 will return "1.0" and "1.1". The number after the decimal position is the ghost ID. Since this two ghost IDs are not the same, the aggregator will only return a single one, namely the longest prefix matching will be "A/B". If there is no ghost IDs, the treatment will be the same as described above. There are many ways to assign a ghost ID to each treelet. One implementation uses a hash map.

Figure 8:
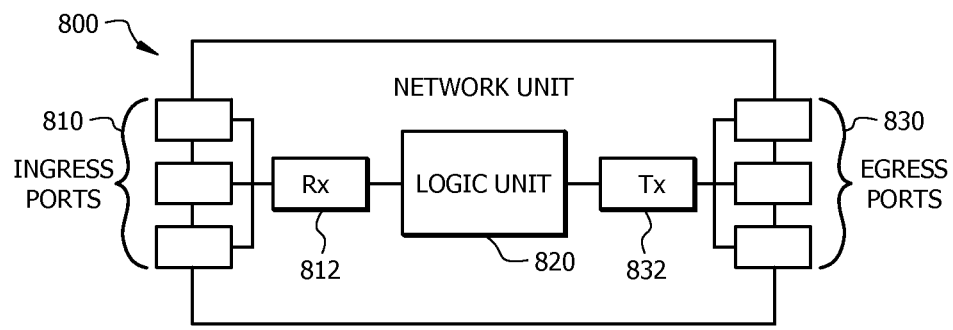
FIG. 8 is a schematic diagram of an embodiment of a network unit.

FIG. 8 illustrates an embodiment of a network unit 800, which may be any device that transports and processes data through a network, a cloud, or a video transcoding system, such as the LPM switches 402. The network unit 800 may comprise one or more ingress ports or units 810 coupled to a receiver (Rx) 812 for receiving signals, frames, and/or data (e.g., video files/segments) from other network units or components. The network unit 800 may comprise a logic unit 820 that support or implement the LPM with treelet methods and systems described above. The logic unit 820 may be implemented using hardware, software, or both. The network unit 800 may also comprise one or more egress ports or units 830 coupled to a transmitter (Tx) 832 for transmitting signals, frames, and/or data (e.g., video files/segments) to the other network units or components. The components of the network unit 800 may be arranged as shown in FIG. 8.

Figure 9:
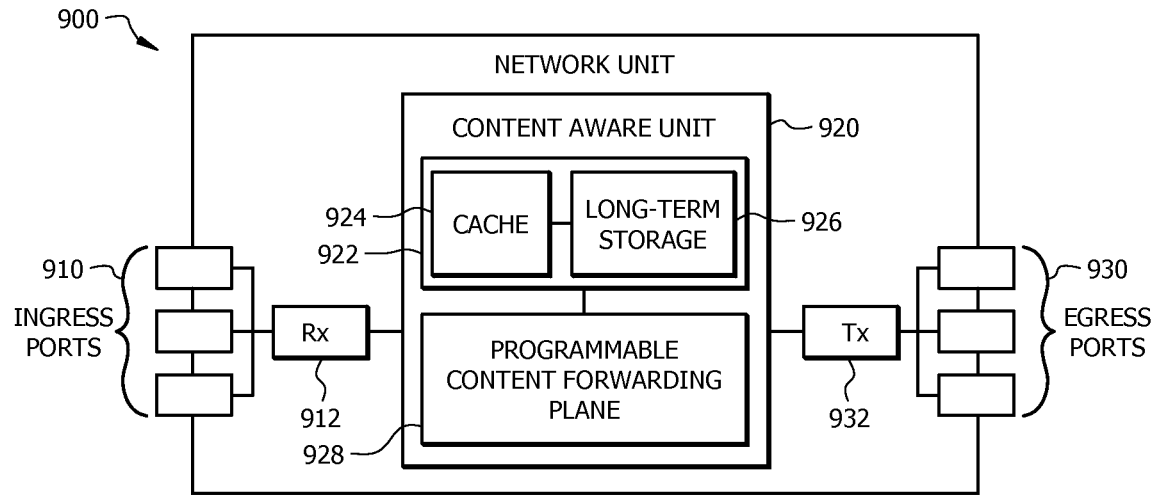
FIG. 9 is a schematic diagram of an embodiment of a content aware network unit.

FIG. 9 illustrates an embodiment of a network unit 900, which may be any device that transports and processes data through a network. For instance, the network unit 900 may be located in the LPM switch 402 or any node in the network 400, or any node in the schemes described above. The network unit 900 (i.e., content router) may also be configured to implement or support the LPM with treelets systems and methods described above. The network unit 900 may comprise one or more ingress ports or units 910 coupled to a receiver (RX) 912 for receiving signals and frames/data from other network components. The network unit 900 may comprise a content aware unit 920 to determine which network components to send content to. The content aware unit 920 may be implemented using hardware, software, or both. The network unit 900 may also comprise one or more egress ports or units 930 coupled to a transmitter (TX) 932 for transmitting signals and frames/data to the other network components. The receiver 912, content aware unit 920, and transmitter 932 may also be configured to implement at least some of the disclosed schemes and methods, which may be based on hardware, software, or both. The components of the network unit 900 may be arranged as shown in FIG. 9.

The content aware unit 920 may also comprise a programmable content forwarding plane block 928 and one or more storage blocks 922 that may be coupled to the programmable content forwarding plane block 928. The programmable content forwarding plane block 928 may be configured to implement content forwarding and processing functions, such as at an application layer or L3, where the content may be forwarded based on content name or prefix and possibly other content related information that maps the content to network traffic. Such mapping information may be maintained in a content table at the content aware unit 920 or the network unit 900. The programmable content forwarding plane block 928 may interpret user requests for content and accordingly fetch content, e.g., based on meta-data and/or content name, from the network or other content routers and may store the content, e.g., temporarily, in the storage blocks 922. The programmable content forwarding plane block 928 may then forward the cached content to the user. The programmable content forwarding plane block 928 may be implemented using software, hardware, or both and may operate above the IP layer or L2. The storage blocks 922 may comprise a cache 924 for temporarily storing content, such as content that is requested by a subscriber. Additionally, the storage blocks 922 may comprise a long-term storage 926 for storing content relatively longer, such as content submitted by a publisher. For instance, the cache 924 and the long-term storage 926 may include Dynamic random-access memories (DRAMs), solid-state drives (SSDs), hard disks, or combinations thereof.

Figure 10:
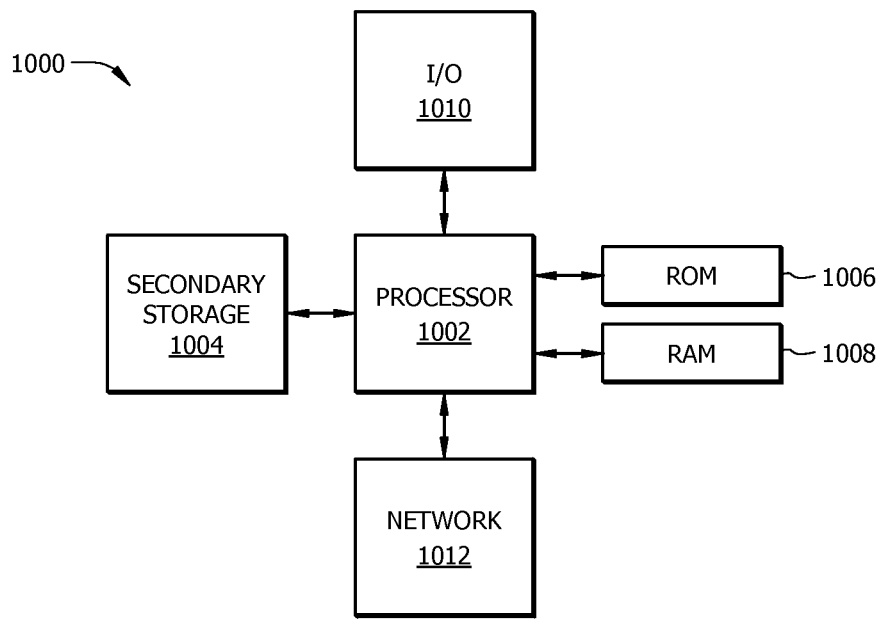
FIG. 10 is a schematic diagram of an embodiment of a general-purpose computer system.

The network components and devices described above may be implemented on any general-purpose network component, such as a computer or network component with sufficient processing power, memory resources, and network throughput capability to handle the necessary workload placed upon it. FIG. 10 illustrates a typical, general-purpose network component 1000 suitable for implementing one or more embodiments of the components disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more ASICs or digital signal processors (DSPs).

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for determining a location of a requested resource, comprising:
    receiving a request for a resource from a client, wherein the resource is identified by a hierarchically structured name;
    decomposing the hierarchically structured name into a plurality of requested two-level treelets;
    obtaining a plurality of stored two-level treelets that represent a hierarchical prefix tree, wherein at least some of the stored two-level treelets comprise a parent node located at a first hierarchical level and one or more child nodes located at a second hierarchical level;
    independently comparing each of the requested two-level treelets to each of the stored two-level treelets; and
    determining a longest prefix match of the hierarchically structured name from the comparison of the requested two-level treelets and the stored two-level treelets,
    wherein independently comparing at least two of the requested two-level treelets with at least two of the stored two-level treelets is performed in a parallel manner.

2. The method of claim 1, wherein each of the requested two-level treelets correspond a pair of hierarchical levels within the hierarchically structured name, and wherein determining the longest prefix match of the hierarchically structured name comprises:
    determining a first mismatch from the comparison of the requested two-level treelets and the stored two-level treelets, wherein the first mismatch represents a mismatch between one of the stored two-level treelets and one of the requested two-level treelets that corresponds to a hierarchical level closest to a root level of the hierarchically structured name;
    identifying the first mismatch as an end of the matched longest prefix of the hierarchically structured name; and
    constructing a longest prefix match name by joining the requested two-level treelets that matched the stored two-level treelets.

3. The method of claim 2, wherein the method further comprises obtaining the child nodes' information to construct the longest prefix match name.

4. The method of claim 1, wherein the plurality of stored two-level treelets are represented as a plurality of hash keys, and wherein the method further comprises hashing the requested two-level treelets.

5. The method of claim 1, wherein the plurality of stored two-level treelets comprise a ghost identifier (ID) to distinguish a common node name appearing in two different ones of the stored two-level treelets.

6. The method of claim 1, further comprising applying a Huffman algorithm to the plurality of requested two-level treelets.

7. The method of claim 1, further comprising determining an egress port corresponding to the longest prefix match and forwarding the request through the identified egress port.

8. The method of claim 7, wherein the request comprises a request for content and further comprising:
    receiving the content from a storage node; and
    forwarding the content to the client.

9. The method of claim 1, further comprising receiving a second request for a second resource, wherein the second resource is identified by a second hierarchically structured name, wherein the second hierarchically structured name has a different size than the hierarchically structured name, and wherein the parent nodes and the child nodes of the stored two-level treelets correspond to a plurality of nodes within the hierarchical prefix tree.

10. The method of claim 1, wherein independently comparing each of the requested two-level treelets to each of the stored two-level treelets comprises performing the comparison by a plurality of lookup agents substantially simultaneously.

11. A network unit for lowest prefix matching with treelets, comprising:
    an ingress port configured to receive a request for a resource, wherein the request comprises a hierarchically structured name that provides a location for a resource;
    an egress port;
    a treelet data storage comprising a plurality of stored two-level treelets that represent a plurality of prefix rules used to form a prefix tree, wherein each of the stored two-level treelets comprises a parent node located at a first hierarchical level, wherein at least some of the stored two-level treelets comprise one or more child nodes located at a second hierarchical level; and
    a processor coupled to the ingress port, the egress port and the treelet data storage, wherein the processor is configured to:
    decompose the hierarchically structured name into a plurality of two-level segments found within a plurality of hierarchical levels associated with the hierarchically structured name;
    independently compare each of the two-level segments to each of the stored two-level treelets; and
    determine a longest prefix match of the hierarchically structured name from the comparison of the two-level segments and the stored two-level treelets,
    wherein independently comparing the two-level segments to the stored two-level treelets is performed in parallel.

12. The network unit of claim 11, wherein the processor is further configured to:
    determine one or more mismatches between the two-level segments and the stored two-level treelets;
    identify a first of the mismatches, corresponding to a hierarchical level closest to a root level of the hierarchically structured name, as an end of the matched longest prefix of the hierarchically structured name; and join the two-level segments that match the stored two-level treelets to construct a longest prefix match name, wherein the joined two-level segments correspond to hierarchical levels subsequent to the root level and prior to the first mismatch.

13. The network unit of claim 11, further comprising a forwarding information base (FIB), wherein the processor is further configured to identify the egress port based on a correspondence with the longest prefix match, and wherein the correspondence is obtained from the FIB.

14. The network unit of claim 13, wherein the processor is further configured to forward the request through the identified egress port.

15. The network unit of claim 14, wherein the request comprises a request for content, wherein the ingress port is configured to receive the content from a storage node, and wherein the egress port is configured to forward the content to a client.

16. The network unit of claim 11, wherein the processor is further configured to decompose the prefix tree to obtain the stored two-level treelets, and wherein the parent nodes and the child nodes of the stored two-level treelets correspond to a plurality of nodes within the prefix tree.

17. The network unit of claim 11, wherein independently comparing each of the two-level segments to each of the stored two-level treelets comprises performing the comparison by a plurality of lookup agents substantially simultaneously.

18. A system for longest prefix matching with treelets, comprising:
a longest prefix matching (LPM) switch,
wherein the LPM comprises: a plurality of ingress ports, a plurality of egress ports, a treelet data storage, and a processor coupled to the treelet data storage,
wherein the plurality of ingress ports are configured to receive a request comprising a hierarchically structured name that references one of the resources,
wherein the treelet data storage comprises a plurality of stored two-level treelets that each comprise a parent node within a first hierarchical level of the stored two-level treelet and one or more child nodes within a second hierarchical level of the stored two-level treelet,
wherein the stored two-level treelets are a plurality of prefix rules that are decomposed from a prefix tree used to map to the resources,
wherein the processor is configured to:
decompose the hierarchically structured name into a plurality of two-level hierarchical segments;
independently compare each of the two-level hierarchical segments to the stored two-level treelets; and
determine a longest prefix match of the hierarchically structured name from the comparison of the two-level hierarchical segments and the stored two-level treelets,
wherein independently comparing each of the two-level hierarchical segments to each of the stored two-level treelets is performed in parallel.

19. The system of claim 18, wherein the hierarchically structured name comprises a plurality of hierarchical levels, wherein each of the two-level hierarchical segments correspond to two of the hierarchical levels within the first hierarchically structured name, and wherein the processor is further configured to:
determine a first mismatch from the comparison of the two-level hierarchical segments and the stored two-level treelets, wherein the first mismatch represents a mismatch between one of the stored two-level treelets and one of the two-level hierarchical segments that corresponds to the hierarchical level closest to a root of the first hierarchically structured name;
identify the first mismatch as an end of the matched longest prefix of the hierarchically structured name; and
construct a longest prefix match name by joining the two level hierarchical segments that match the stored two-level treelets.

20. The system of claim 18, wherein the LPM further comprises a forwarding information base (FIB), and wherein the processor is further configured to:
match one of the egress ports that corresponds to the longest prefix match based on information from the FIB; and
forward the request associated with the first hierarchically structured name through the matched egress ports.

21. The system of claim 18, further comprising a plurality of storage units coupled to the LPM switch, wherein the request comprises a request for content, wherein the ingress ports are configured to receive the content from one or more of the storage units, and wherein the egress ports are configured to forward the content to a client.

22. The system of claim 18, wherein the ingress ports are configured to receive a plurality requests each comprising a hierarchically structured name, wherein the hierarchically structured names have varying sizes, and wherein the parent nodes and the child nodes of the stored two-level treelets correspond to a plurality of nodes within the prefix tree.

23. The system of claim 18, wherein independently comparing each of the two-level hierarchical segments to the stored two-level treelets comprises performing the comparison by a plurality of lookup agents substantially simultaneously.

* * * * *

UNITED STATES PATENT AND TRADEMARK OFFICE
CERTIFICATE OF CORRECTION

| | | |
|---|---|---|
| PATENT NO. | : 8,972,453 B2 | Page 1 of 1 |
| APPLICATION NO. | : 13/469528 | |
| DATED | : March 3, 2015 | |
| INVENTOR(S) | : Jianming Wu, Guangyu Shi and Fu Li | |

It is certified that error appears in the above-identified patent and that said Letters Patent is hereby corrected as shown below:

In the Claims

Column 16, Line 39, Claim 22 should read:

The system of claim 18, wherein the ingress ports are configured to receive a plurality of requests each comprising a hierarchically structured name, wherein the hierarchically structured names have varying sizes, and wherein the parent nodes and the child nodes of the stored two-level treelets correspond to a plurality of nodes within the prefix tree.

Signed and Sealed this
Twenty-fifth Day of August, 2015

Michelle K. Lee
*Director of the United States Patent and Trademark Office*